(12) United States Patent
Logan

(10) Patent No.: US 7,134,633 B2
(45) Date of Patent: Nov. 14, 2006

(54) METHOD AND APPARATUS FOR SECURING CABLES AND THE LIKE

(75) Inventor: Maurus Logan, Elizabeth, NJ (US)

(73) Assignee: Medcount Systems, L.L.C., Tinton Falls, NJ (US)

( * ) Notice: Subject to any disclaimer, the term of this patent is extended or adjusted under 35 U.S.C. 154(b) by 0 days.

(21) Appl. No.: 10/772,909

(22) Filed: Feb. 5, 2004

(65) Prior Publication Data
US 2005/0173598 A1 Aug. 11, 2005

(51) Int. Cl.
F16L 3/12 (2006.01)

(52) U.S. Cl. .................. 248/74.3; 248/74.1; 248/73; 248/70

(58) Field of Classification Search .................. 248/71, 248/65, 56, 73, 74.1, 74.3, 225.11, 220.21, 248/224.8, 231.9; 24/16 PB, 17 AP
See application file for complete search history.

(56) References Cited

U.S. PATENT DOCUMENTS 1,710,157 A * 4/1929 Felix ......................... 248/74.3
3,632,070 A * 1/1972 Thayer ....................... 248/68.1
3,913,876 A * 10/1975 McSherry ................... 248/74.3
4,269,378 A * 5/1981 Barry ........................... 248/56
4,524,937 A * 6/1985 Zizan ......................... 248/74.3
4,638,966 A * 1/1987 Ford ............................ 248/62
5,169,100 A * 12/1992 Milcent et al. ............ 248/68.1
5,314,154 A * 5/1994 O'Grady .................. 248/231.9
5,337,983 A * 8/1994 Mailey ....................... 248/74.3
5,386,615 A * 2/1995 Bernard .................... 24/16 PB
5,390,883 A * 2/1995 Songhurst .................. 248/74.3
5,653,409 A * 8/1997 White et al. .................. 248/73

* cited by examiner

Primary Examiner—Ramon O. Ramirez
Assistant Examiner—Steven Marsh
(74) Attorney, Agent, or Firm—James J. Daley

(57) ABSTRACT

A combination includes a cable tie having a head portion and a tail extending from the head portion to a free end and a securement member for mounting the cable tie to a mounting panel, the cable tie tail extending through the securement member, the securement member being rotatable relative to the cable tie tail and being portable therewith.

9 Claims, 5 Drawing Sheets

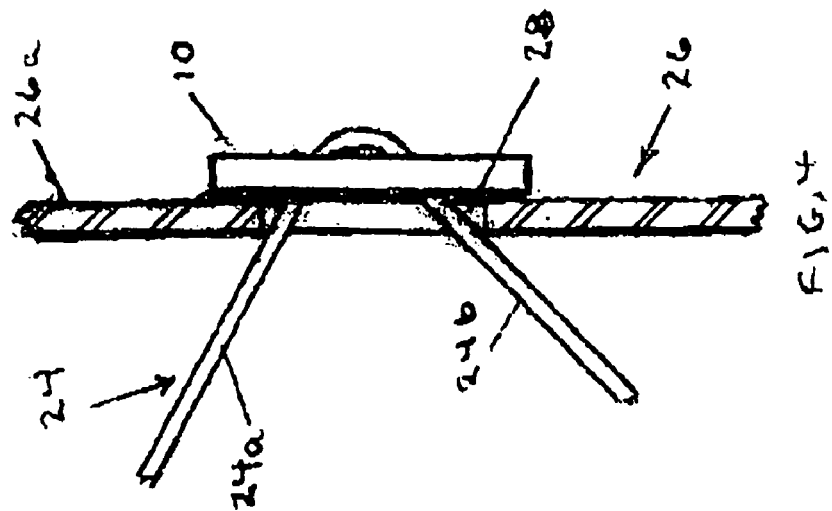
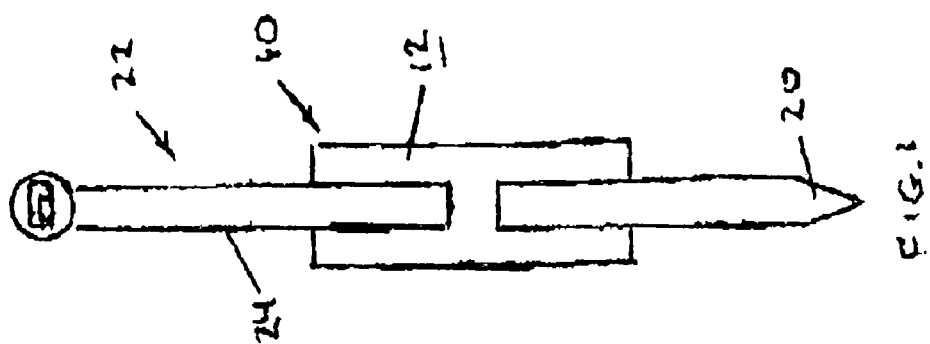
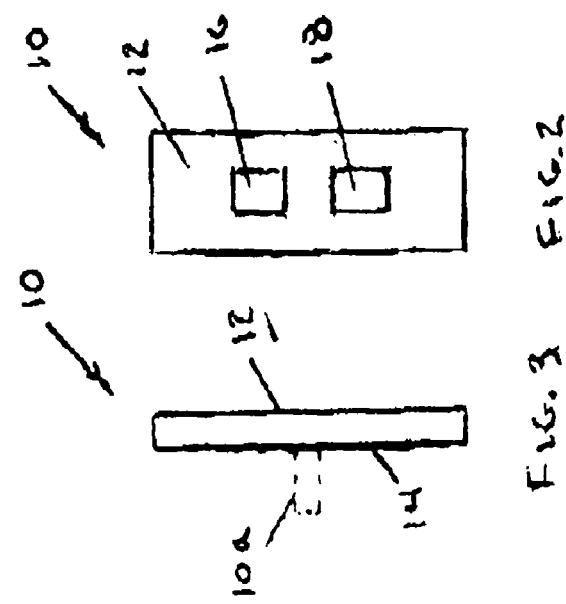

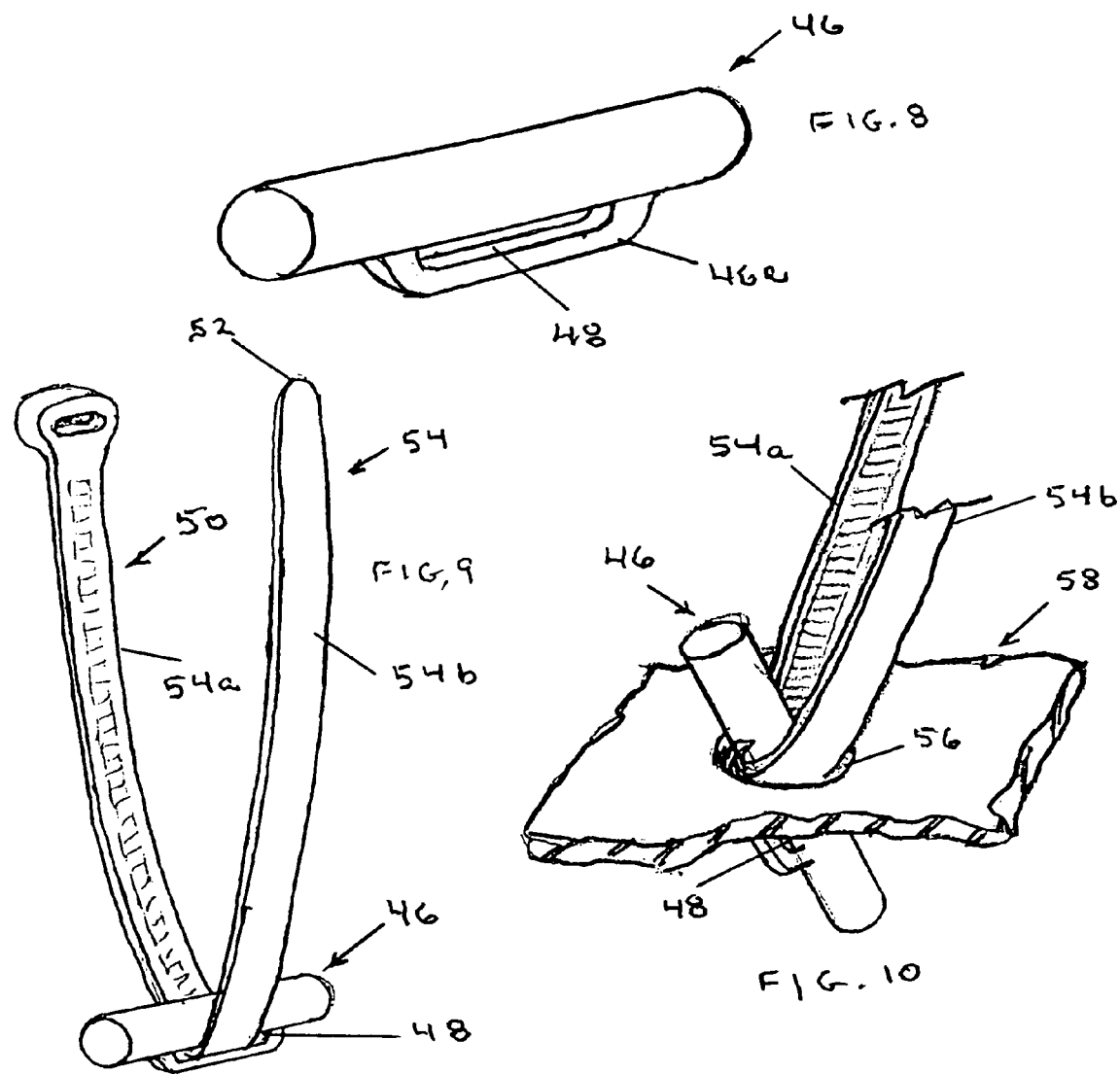

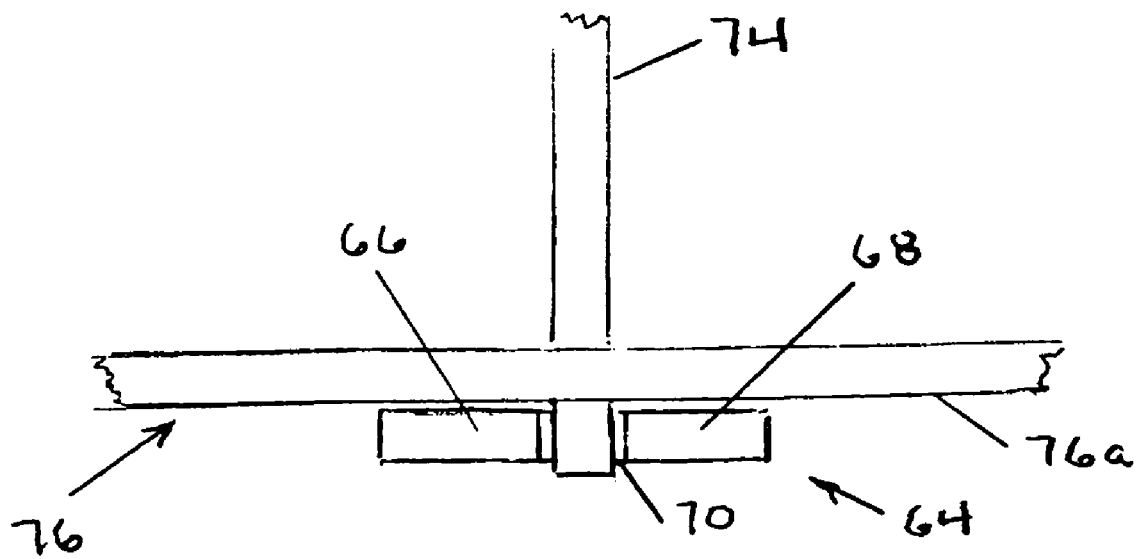
FIG. 16
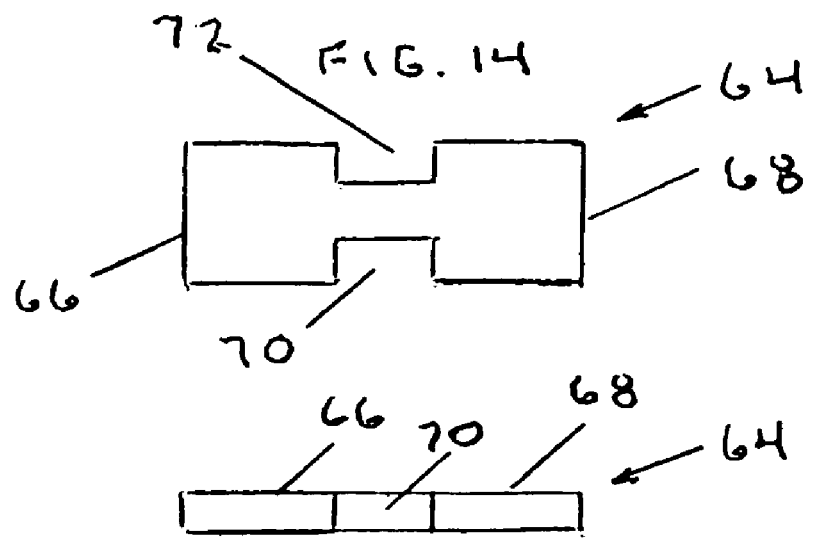
FIG. 14
FIG. 15 ns7 US 7,134,633 B2

METHOD AND APPARATUS FOR SECURING CABLES AND THE LIKE

FIELD OF THE INVENTION

The present invention relates generally to securement apparatus and methods and pertains more particularly to securement apparatus using so-called "cable ties".

BACKGROUND OF THE INVENTION

For many years, the electrical cable industry has had the benefit of cable ties to encircle and ensnare groupings of conductors. Applicant's U.S. Pat. Nos. 3,022,557 and 3,047,945, now expired, respectively show examples of cable ties and tensioning apparatus for use in assembling cable ties and conductor groupings. As shown in these patents, cable ties are typically molded plastic members having a head portion and a tail portion extending from the head portion to a free end. The head portion typically includes a pawl member extending into a tail portion passage extending fully through the head portion. The tail portion is routed about the conductors to be ensnared and has serrations on one or both outer surfaces thereof designed to pass by the pawl member under the pulling pressure of a person or a pulling tool, the pawl retentively engaging the serrations to form a cable tie loop tightly encircling the conductors.

Where it is desired to mount a cable tie to a mounting panel, use is sometimes made of a so-called "mounting head tie", such as are available from Thomas & Betts Corporation under the trademark "Catamount". This cable tie is formed as above described, but further includes a mounting head integrally formed with the tie proper adjacent the tie head portion and defining a circular hole. Use of mounting head ties entails need for a stove bolt and nut, a flat washer and a lock washer. The stove bolt is inserted through the mounting head hole and the flat washer and lock washer are then applied to the bolt and the bolt is then inserted through an opening in a mounting panel. The bolt is then threaded into the nut and tightened.

An alternative to the foregoing apparatus is seen in a "Single-Bundle Mounting Base", also available from Thomas & Betts Corporation under the registered trademark "Ty-Rap". This device is an elongate nylon base, having end openings for receiving screws for mounting the base to a mounting panel and further openings intermediate the end openings. The end of a cable tie opposite the head portion is passed successively through the intermediate openings and the mounting screws are then applied to the base and threaded into openings in the mounting panel. Conductors are now applied to the cable tie and the tie is tightened about the conductors.

From applicant's perspective, use of the mounting head tie or the single-bundle mounting base is costly, labor intensive and inefficient in weight sensitive environments, such as aircraft, where lessening of the securement device weight converts into fuel saving, shortened take-off distances and extended flight mileage.

Lessened cost, labor intensity and weight than provided by the mounting apparatus above described is available, e.g., through the use of so-called "Push Mount Cable Ties" also sold by Thomas and Betts Corporation under the aforesaid Catamount trademark. This device includes an arrowed structure adjacent the cable tie head portion and formed integrally therewith. The arrowed structure is inserted into an opening in the mounting panel and the wings of the arrow spread apart, securing the cable tie to the mounting panel.

From applicant's perspective, such alternative does not provide desired mounting securement strength.

SUMMARY OF THE INVENTION

A primary object of the present invention is to provide simplified apparatus for mounting conductors on a mounting panel.

A more particular object of the present invention is to provide apparatus for mounting conductors on a mounting panel, wherein the apparatus is inexpensive, labor unintensive and efficient in weight sensitive environments.

In attaining the foregoing and other objects, in one aspect, the invention provides in combination, a cable tie having a head portion and a tail extending from the head portion to a free end and a securement member for mounting the cable tie to a mounting panel, the cable tie tail extending through the securement member, the securement member being rotatable relative to the cable tie tail and being portable therewith.

In another aspect, the invention provides, in combination, a mounting panel defining a mounting opening, a cable tie having a head portion and a tail extending from the head portion to a free end and a securement member, the cable tie tail extending through the mounting opening and defining a v-shaped (or u-shaped) tail portion rearwardly of the mounting panel, the securement member being disposed in the v-shaped tail portion rearwardly of the mounting panel, the cable tie tail urging the securement member against a rear surface of the mounting panel.

In a further aspect, the invention provides a method for mounting a cable tie on a mounting panel defining a mounting hole, the cable tie having a head portion and a tail extending from the head portion to a free end, the method comprising the steps of:

a) forming the cable tie tail to have a v-shaped portion;

b) inserting the cable tie tail v-shaped portion into and through the mounting panel hole until the v-shaped portion is disposed rearwardly of the mounting panel; and c) associating a securement member with the cable tie so that the securement member is disposed in the v-shaped portion of the cable tie tail rearwardly of the mounting panel, the securement member being selected to have a dimension exceeding an extent of the mounting panel hole.

The foregoing and other features of the invention will be further understood from the ensuing detailed description of preferred embodiments and practices and from the drawings, wherein like reference numerals identify like components throughout.

DESCRIPTION OF THE DRAWINGS

FIG. 1 is a plan elevation of a first embodiment of mountable cabling apparatus in accordance with the invention.

FIG. 2 is a plan elevation of the securement device of the FIG. 1 apparatus.

FIG. 3 is a left side elevation of the securement device of FIG. 2.

FIG. 4 is side elevation of the FIG. 1 cabling apparatus assembled with a mounting panel.

FIG. 8 is a perspective view of a third form of a securement device in a third embodiment of cabling apparatus in accordance with the invention.

FIG. 9 is a perspective view of the securement device of FIG. 8 assembled with a cable tie.

FIG. 10 is a perspective view of an initial stage of assembly of the FIG. 9 assembly with a mounting panel.

FIG. 14 is a plan elevation of a further embodiment of a securement device in accordance with the invention.

FIG. 15 is a side elevation of FIG. 14.

FIG. 16 is a schematic of a further embodiment of cabling apparatus in accordance with the invention, using the securement device of FIGS. 14 and 15.

DETAILED DESCRIPTION OF THE INVENTION

Figure 5:
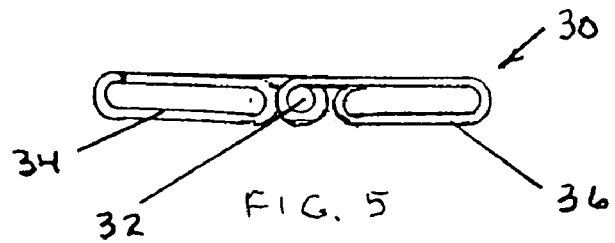
FIG. 5 is a plan elevation of a second form of securement device in a second embodiment of cabling apparatus in accordance with the invention.

Referring to FIGS. 1–3, securement device 10 is a flat rigid member which may be comprised of metal and which defines opposed flat surfaces 12 and 14. Openings 16 and 18 extend between surfaces 12 and 14 and through securement device 10.

End 20 of cable tie 22 is inserted into and through opening 16 and returned through opening 18 and pulled downwardly such that tail 24 of cable tie 22 is disposed in facing relation to each of surfaces 12 and 14.

Turning to FIG. 4, the apparatus of FIG. 1 is assembled with mounting panel 26. In reaching the assembly of FIG. 4, portions 24a and 24b of cable tie tail 24 are brought into contacting relation.

At this juncture, securement device 10 is rotated into engagement with either of tail portions 24a and 24b such that securement device 10 is generally aligned with the folded cable tie and has a free end portion extending outwardly of the folded cable tie. Such free end portion is now passed into and through opening 28 of mounting panel 26. Securement device 10 now assumes the disposition thereof shown in FIG. 4, i.e., in facing relation to the rear surface 26a of mounting panel 26 aside opening 28.

Inherent spring strength in the folded cable tie urges securement device 10 into contact with rear surface 26a, thus securing the assembly shown in FIG. 4. Conductors (not shown) may now be nested interiorly of the folded cable tie and the cable tie may be secured tightly thereabout.

Figure 6:
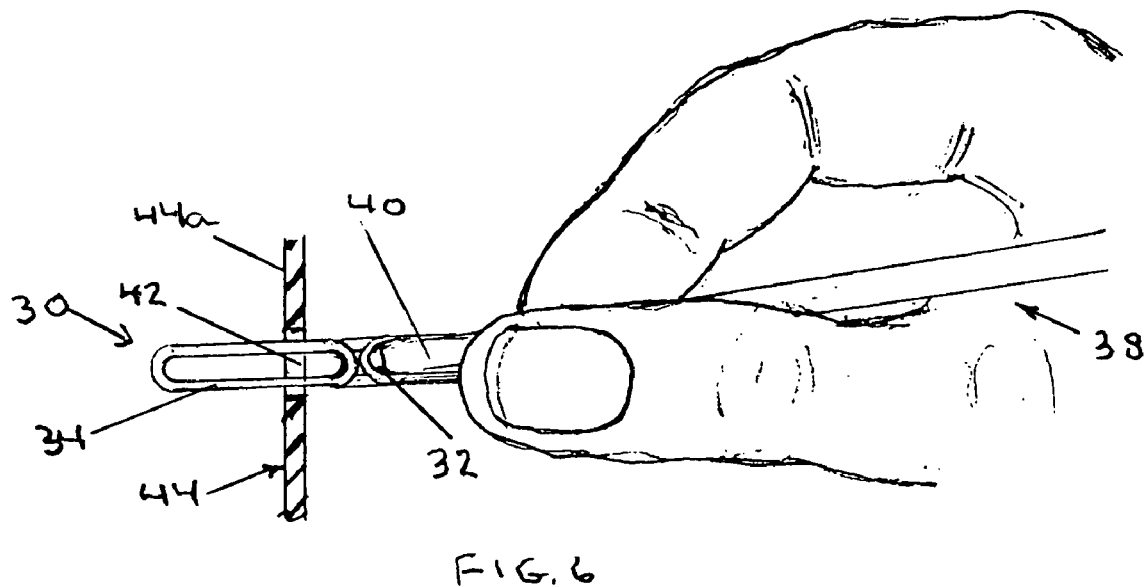
FIG. 6 is a side elevation of the securement device of FIG. 5 assembled with a cable tie and showing a stage of that assembly being inserted into a mounting hole of a mounting panel.
Figure 7:
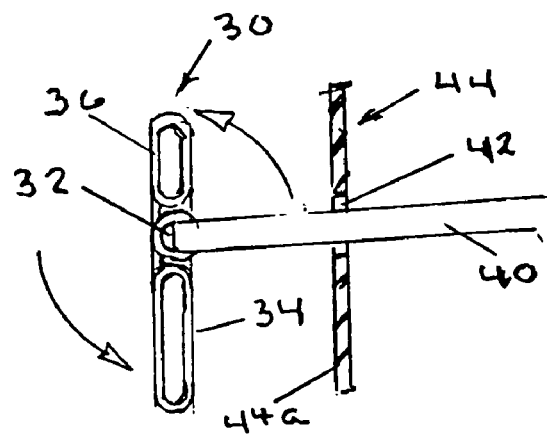
FIG. 7 depicts a second stage of mounting activity following that of FIG. 6.

Turning to FIGS. 5–7, securement device 30 comprises a metal wire formed to define a central aperture 32 and wings 34 and 36 aside central aperture 32.

Cable tie 38 has tail 40 extending to a free end. Such free end is inserted into and through aperture 32 and tail 40 is folded to define a v-shaped portion in aperture 32. Securement device 30 is now rotated relative to the folded tail to assume the orientation of the securement device shown in FIG. 6, i.e., to be in alignment with the folded tail. Securement device 30 is now inserted into and through opening 42 of mounting panel 44.

When securement device 30 is fully rearwardly of rear surface 44a of mounting panel 44, the securement device rotates relative to the folded cable tie tail to assume its disposition shown in FIG. 7. In this connection, the rotation can be of selected sense, e.g., by weighting wings 34 and 36 diversely. In the example shown, wing 34 is larger than wing 36 and the rotative sense is counterclockwise, as indicated by the arrows in FIG. 7.

As in the case of the embodiment of FIGS. 1–14, inherent spring strength in the folded cable tie urges securement device into contact with rear surface 44a, thus securing the assembly. Conductors (not shown) may now be nested interiorly of the folded cable tie and the cable tie may be secured tightly thereabout.

Referring to FIG. 8, securement device 46 is in the form of a cylinder having dependent portion 46a defining slot 48 extending therethrough. In FIG. 9, cable tie 50 is assembled with securement device 46 by passing free end 52 of tail 54 through slot 48.

At this juncture, securement device 46 is rotated into engagement with either of tail portions 54a and 54b such that securement device 46 is generally aligned with the folded cable tie and has a free end portion extending outwardly of the folded cable tie. Such free end portion is now passed into opening 56 of mounting panel 58, as is shown in FIG. 10. Securement device 46 now assumes the disposition thereof shown in FIG. 11, i.e., in facing relation to the rear surface 58a of mounting panel 58 aside opening 56.

Figure 11:
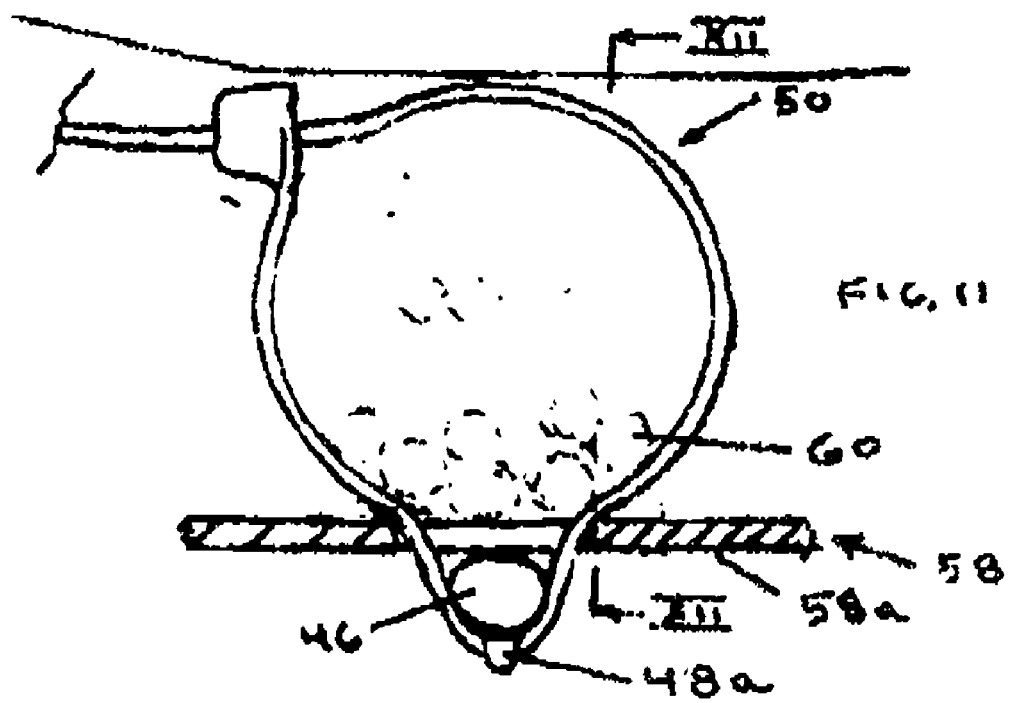
FIG. 11 is an elevation of a final stage of assembly of the FIG. 9 assembly with a mounting panel and showing the cable tie secured about conductors.
Figure 12:
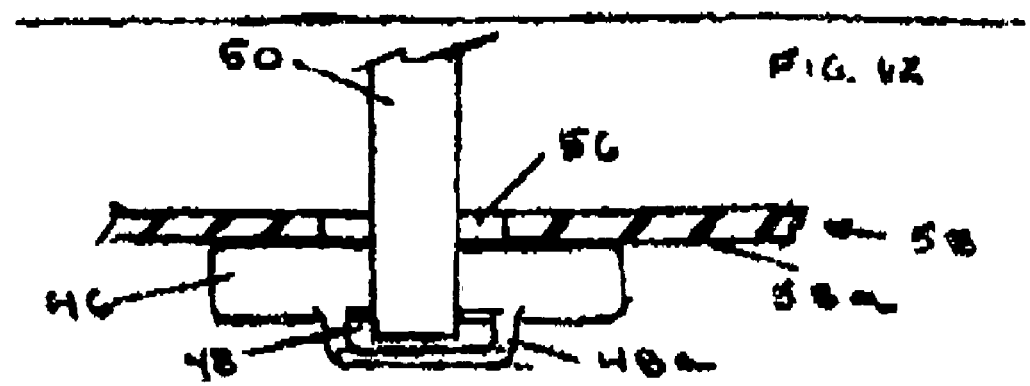
FIG. 12 is a partial side elevation of the FIG. 11 apparatus as would be seen from plane XII—XII of FIG. 11.

Inherent spring strength in the folded cable tie urges securement device into contact with rear surface 58a, thus securing the assembly shown in FIG. 12. Conductors 60 are now be nested interiorly of the folded cable tie and the cable tie is secured tightly thereabout as shown in FIG. 11, FIG. 12 showing a side partly sectioned view of FIG. 12.

Figure 13:
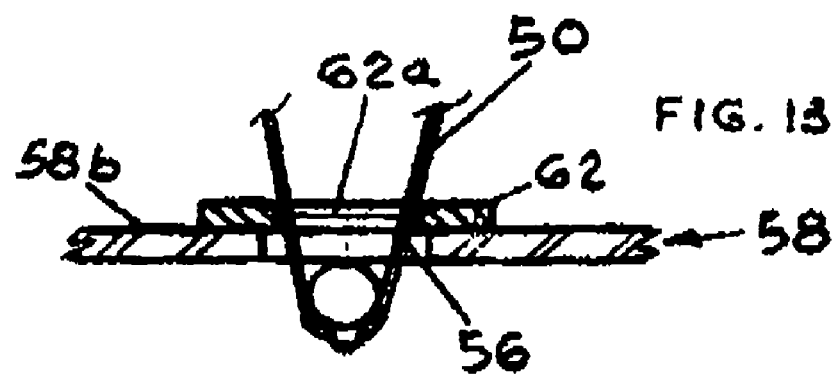
FIG. 13 is a partial side elevation of a modified form of the third embodiment of the invention.

Referring to FIG. 13, it shows the embodiment of FIGS. 8–12 modified to include bushing 62 in overlying relation to front surface 58b of mounting panel 58, the bushing having central opening 62a with a beveled sidewall. Opening 62a is of lesser diameter than the opening 56 of mounting panel 58. Bushing 62 thus spaces the cable tie tail from possible chafing against the sidewall of opening 56.

In all of the above described embodiments, the securement devices are assembled with the cable tie tails prior to rotation of the securement devices and insertion of the securement devices into the mounting panel openings. The embodiment of FIGS. 14–16 involves a different method and securement device.

Securement device 64 is a flat rigid member having wings 66 and 68 aside a narrowed central portion defining marginal notches 70 and 72.

Cable tie 74 has its tail folded and inserted into an opening in mounting panel 76 to define a cable tail v-shaped portion below rear surface 76a of mounting panel 76. Securement member is now inserted into the cable tail v-shaped portion and rotated such that the cable tie tail is resident in the marginal notches (slots) of securement device 64, as shown for notch 70 in FIG. 16.

As in the case of the other embodiments, inherent spring strength in the folded cable tie urges securement device 64 into contact with rear surface 76a, thus securing the assembly. Conductors (not shown) may now be nested interiorly of the folded cable tie and the cable tie may be secured tightly thereabout.

Various changes may be introduced in the disclosed preferred embodiments and practices without departing from the invention. By way of example, securement device 10 of FIG. 1 may include a dependent member 10*a* (shown in phantom, as optional) which can intensify the v-shape or u-shape of the portion of the cable tie tail rearwardly of the mounting panel, thereby increasing the elastic force of the cable tie tail securing the securement member to the mounting panel. Accordingly, it is to be appreciated that the true spirit and scope of the invention is set forth in the following claims.

What is claimed is:

1. A method for use in assembling conductors with a mounting panel, comprising the steps of:
   (a) providing a cable tie having a head and a tail extending from said head to a tail free end, said tail having a self-bias to a planar condition;
   (b) attaching a securement member to said tail using the self-bias of said tail to render said securement member portable with said cable tie; and
   (c) attaching said securement member and said cable tie to said mounting panel using the self-bias of said tail whereby the self-bias of said tail causes the tail to press against ends of an opening in the mounting panel when the cable tie is attached to said mounting panel.

2. The method claimed in claim 1, including the further step, practiced between practice of said steps (b) and (c) of releasing said attachment of said securement member and said cable tie by folding said tail.

3. The method claimed in claim 1, including the further step, practiced between practice of said steps (b) and (c) of releasing said attachment of said securement member and said cable tie by folding said tail and rotating the folded tail into alignment with said securement member such that a portion of said securement member is disposed outwardly of said folded tail.

4. The method claimed in claim 3, wherein said step (c) is practiced by inserting said securement member portion and the fold part of said tail through said mounting panel and rotating said securement member relative to said folded tail from such alignment therewith into orthogonality with the folded tail.

5. The method claimed in claim 1, wherein said step (b) is practiced by forming said securement member to extend longitudinally with said tail and to have first and second perimetrically bounded elongate apertures opening along their lengths into first and second opposed sides of said securement member and a tail support portion longitudinally between said first and second apertures.

6. The method claimed in claim 1, wherein said step (b) is practiced by forming said securement member with first and second opposed surfaces, a first portion defining a first aperture extending transversely through said securement member into first and second mutually aligned openings in said first and second surfaces, a second portion continuous with said first portion and being unapertured, and a third portion continuous with said second portion and defining a second aperture extending transversely through said securement member into third and fourth mutually aligned openings in said first and second surfaces.

7. The method claimed in claim 6, wherein said step (c) is practiced by selecting said mounting panel to have a front surface and a rear surface and to define a mounting opening extending therebetween, one of said securement member first and second outer surfaces bearing against said mounting panel rear surface under the influence of said cable tie tail self-bias.

8. The method claimed in claim 7, wherein said mounting panel opening is selected to be perimetrically bounded by said mounting panel.

9. The method claimed in claim 6, wherein said securement member first and second surfaces are formed to be uniformly spaced fully longitudinally of said securement member.

\* \* \* \* \*